United States Patent [19]

Fajt, Jr.

[11] 4,205,477
[45] Jun. 3, 1980

[54] RELEASABLE BUOYANT FISHING FLOAT

[76] Inventor: Robert Fajt, Jr., 2149 Iris Rd., Pueblo, Colo. 81006

[21] Appl. No.: 929,699

[22] Filed: Jul. 31, 1978

[51] Int. Cl.² .............................................. A01K 93/00
[52] U.S. Cl. .................................. 43/43.12; 43/44.91; 43/44.95
[58] Field of Search ................. 43/43.12, 44.87, 44.88, 43/44.91, 44.94, 44.95, 43.1, 42.05

[56] References Cited

U.S. PATENT DOCUMENTS

| | | | |
|---|---|---|---|
| 878,362 | 2/1908 | Denning | 43/44.91 |
| 1,986,441 | 1/1935 | Koepke | 43/44.91 |
| 2,183,818 | 12/1939 | Minser | 43/44.95 X |
| 2,186,281 | 1/1940 | Cochran | 43/44.95 |
| 2,293,294 | 8/1942 | Heckman | 43/44.88 |
| 2,440,989 | 5/1948 | Van Brunt | 43/44.88 X |
| 2,724,206 | 11/1955 | Miller | 43/43.1 |
| 2,902,792 | 9/1959 | Friday | 43/44.91 X |
| 2,957,267 | 10/1960 | Dempsey | 43/43.12 X |

*Primary Examiner*—Nicholas P. Godici
*Attorney, Agent, or Firm*—W. Britton Moore

[57] ABSTRACT

A releasable fishing float for use in ice fishing including a cork body tapered downwardly from an enlarged upper end to a reduced lower end to provide a generally buoyant pear-shaped body. The upper end is internally tapered and a longitudinal bore extends therethrough to receive the fishing line. A coil spring is attached parallel to the top upper edge so that the line may be wedged between the coils thereof to retain the line thereat and the float at a suitable distance below the ice surface. When a fish takes the hook on the lower end of the line and the hook is set, the line becomes unclipped from the coil spring and slides freely through the cork and the latter is out of the way during reeling of the line and fish. The submerged cork offers no resistance to the fish and signals the smallest bite.

2 Claims, 4 Drawing Figures

RELEASABLE BUOYANT FISHING FLOAT

This invention relates to a buoyant float for ice fishing and longitudinally bored for receiving the line therethrough and having a coil spring arranged at it upper end for removably clamping the line thereto.

While it has long been customary to employ buoyant fishing floats in fishing, such as those, for example of U.S. Pat. Nos. to Stanton 829,608, Owen 980,667, Menefee 2,004,414, Walker 2,269,615, Cheriere 2,492,033, and Miller 2,724,206, none thereof has been peculiarly designed and adapted for use in ice fishing, wherein it is desirable that the float be so arranged on the line that it may removably be secured thereto just below the ice surface, but will be freed therefrom for slidable movement of the line therethrough and the float will be out of the way to permit reeling of the line when a fish takes the hook.

The principal object of the present invention is to provide a buoyant float having a longitudinal bore therethrough for receiving the fishing line and wherein a coil spring is attached to and arranged parallel to the annulus at the upper end thereof for clamping the line between the coils and retaining the cork just below the ice surface, but which may be freed therefrom when a fish takes the line so that the line will slide through the cork during reeling.

Another object is the provision of a releasable buoyant fishing float having an internally tapered upper end and a longitudinal bore extending therethrough and wherein a relatively small coil spring with fine coils is arranged above the peripheral upper end so that a line extending through the bore may be wedged and clamped therein without kinking or damaging the line and is removed therefrom when a fish exerts a pull on the line.

A further object is to provide a relatively small, light, inexpensive, and easily handled and stored fishing cork float.

These and other objects and advantages will be apparent as the specification is considered with the accompanying drawings, wherein FIG. 1 is a perspective view of the cork;

Figure 1:
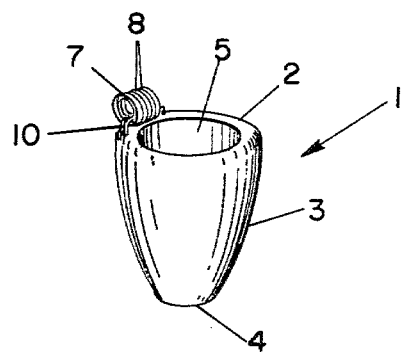
Figure 2:
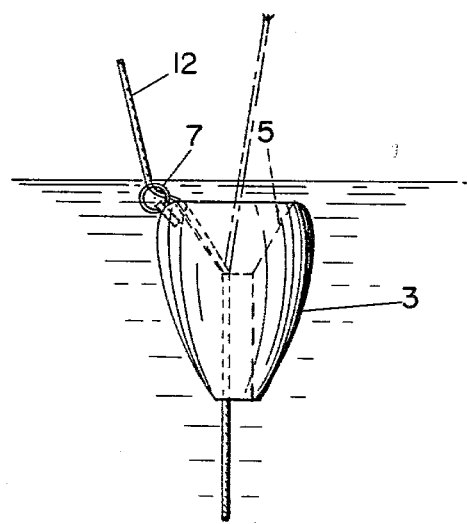
FIG. 2 is a side elevation of the cork in the position assumed when it is submerged in a fishing hole in the ice, with the line clamped in the coil spring.
Figure 3:
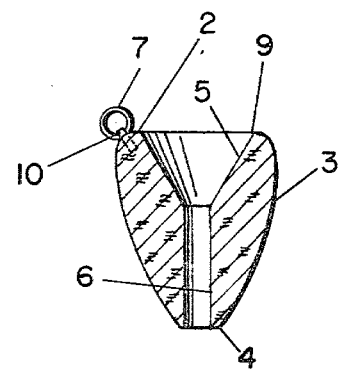
FIG. 3 is a cross section through the cork.
Figure 4:
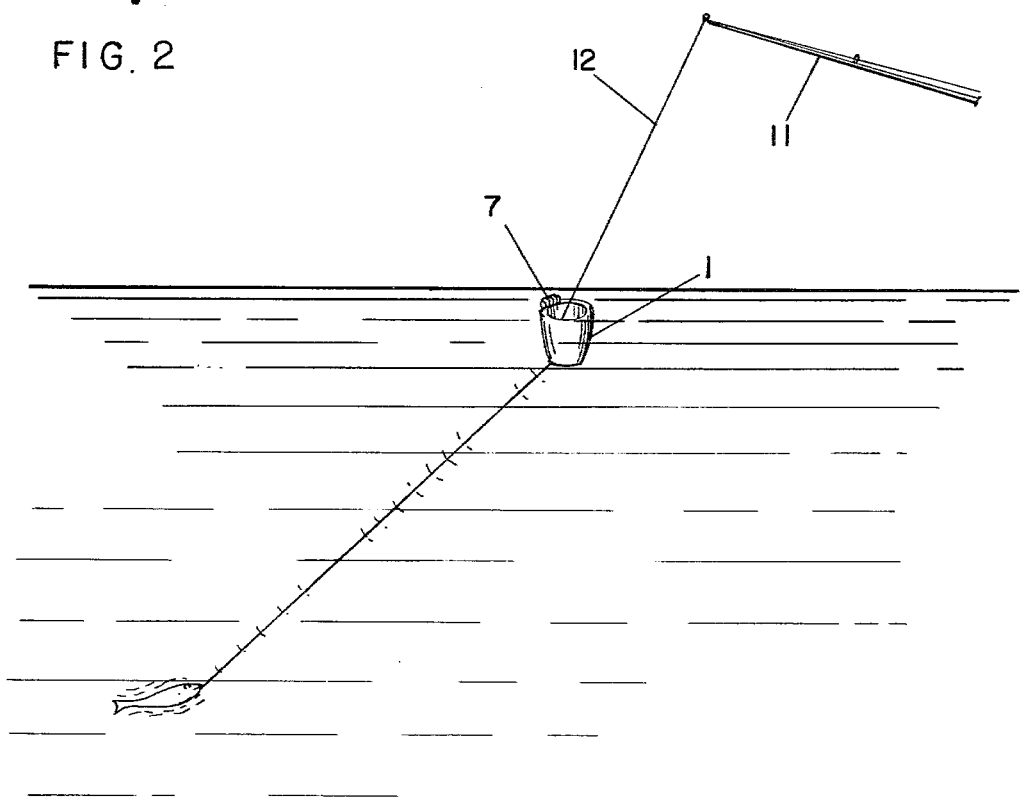
FIG. 4 is a side elevation showing how the line slides through the cork and, when a fish exerts a pull on the line and the line is reeled.

Referring more particularly to the drawings, wherein similar reference characters designate like parts throughout the several views thereof, numeral 1 generally identifies a fishing cork or float, of any suitable buoyant material, such as cork, wood or plastic. Cork 1 is substantially pear-shaped and is tapered downwardly, as at 3, from a flattened upper end 2, to a reduced and somewhat pointed lower end 4. The upper end of the cork is internally tapered or recessed, as at 5, and a central bore 6 extend longitudinally through the body thereof, from lower end 4 to the lower end of recess 5.

The cork body may be painted a bright orange so as to be readily visible.

A relatively short and small coil spring 7 of any suitable material having very fine diameter coils 8 is arranged transversely and parallel to the lip 9 of recess 5 and is anchored thereat by any suitable fastener, such as, a staple 10, lengthwise spanning the coils and embedded in the cork body, as best shown in FIG. 1. The coil spring projects above and tangent to lip 9 and extends outwardly of the upper end of the cork body. While size or dimensions usually are of little importance, it is significant to note that the cork and coil spring may be very minute, with the former, for example, being approximately 1⅛ inch in length ×⅝ inch in diameter, and the latter being approximately 3/16 inch in length ×3/16 inch in diameter. It will, of course, be apparent that the cork and spring may be increased to various sized. The spring will not kink or damage the line.

The cork is arranged on any suitable monofilament line 12, which may extend from a fishing pole 11 and the spinning or other reel thereon, not shown, by the line extending through the bore 6 thereof. It is usually customary for the cork to be set so that it floats an inch or two beneath the water surface in the ice hole, which is accomplished by inserting and pushing the line between the spring coils 8 so as to affix or clamp the line therein. When a fish takes and the hook at the lower end of the line is set, a tug is exerted thereon which pulls and unclips the line from the coils and permits the line and out of the way, while the line to slide freely through the cork with the cork being fish are being reeled. When the fish takes the hook, the cork already being submerged, offers no resistance to the fish, and signals the smallest bite.

While a preferred embodiment of cork float has been shown and described, it is to be understood that various changes and improvements may be made therein without departing from the scope and spirit of the appended claims.

What I claim is:

1. A hooked fishing line float for ice fishing and the like comprising a buoyant generally pear shaped cork body, said body being tapered downwardly and having a longitudinal bore extending through the center of said body from an enlarged internally tapered upper end to a reduced lower end, coil spring means arranged tangentially and generally parallel to the rim of said tapered upper end, said spring means projecting above and being anchored to one side of said rim whereby a line extending through said bore is inserted between and frictionally clamped between the coils of said spring means for positioning the float thereon below the water and ice surface so that when the fish takes the hook and the latter is set the line is dislodged and freed from said spring means and the line will slide through the cork during reeling.

2. In a fishing line float, according to claim 1, wherein anchoring means extends lengthwise through the coils of said spring means and is embedded in said body to fixedly secure said spring means thereon.

* * * * *